United States Patent [19]

Lee, Sr.

[11] 4,395,997

[45] Aug. 2, 1983

[54] FUEL PRE-HEATER

[76] Inventor: David C. Lee, Sr., Rte. 1, Box 121, McLain, Miss. 39456

[21] Appl. No.: 322,388

[22] Filed: Nov. 17, 1981

[51] Int. Cl.³ ............................................ F02M 31/00
[52] U.S. Cl. .................................. 123/557; 123/552; 165/51; 165/134 R
[58] Field of Search ................. 123/557, 552; 165/51, 165/52, 70, 134 R, DIG. 11

[56] References Cited

U.S. PATENT DOCUMENTS

| | | | |
|---|---|---|---|
| 1,067,582 | 7/1913 | Boyd | 123/557 |
| 1,318,265 | 10/1919 | Clemmensen | 123/557 |
| 4,091,782 | 5/1978 | Dunham | 123/557 |
| 4,228,848 | 10/1980 | Wadkinson | 165/134 R |
| 4,306,617 | 12/1981 | Lancaster | 165/154 |

Primary Examiner—Ronald H. Lazarus
Attorney, Agent, or Firm—Harvey B. Jacobson

[57] ABSTRACT

A fuel pre-heater including a compartment for receiving fuel, a hollow metal member passing centrally through the fuel space in the compartment and coupled to the liquid cooling system of an internal combustion engine for transferring heat to the fuel, a length of a hollow pipe of insulation plastic material disposed within the hollow metal member and for regulating and controlling water flow therethrough to a heat transfer surface of the hollow metal member so that the heat transferred therefrom is received by the fuel and the fuel, being thus pre-heated, passes to the engine. The hollow plastic pipe regulates the water flow and controls the rate of heat transfer through and around it by an arrangement of apertures therein. The plastic pipe may be of polyvinyl chloride. The compartment may have a bracket for mounting it securely upon a wall in the engine compartment of the vehicle.

9 Claims, 4 Drawing Figures

U.S. Patent   Aug. 2, 1983   4,395,997
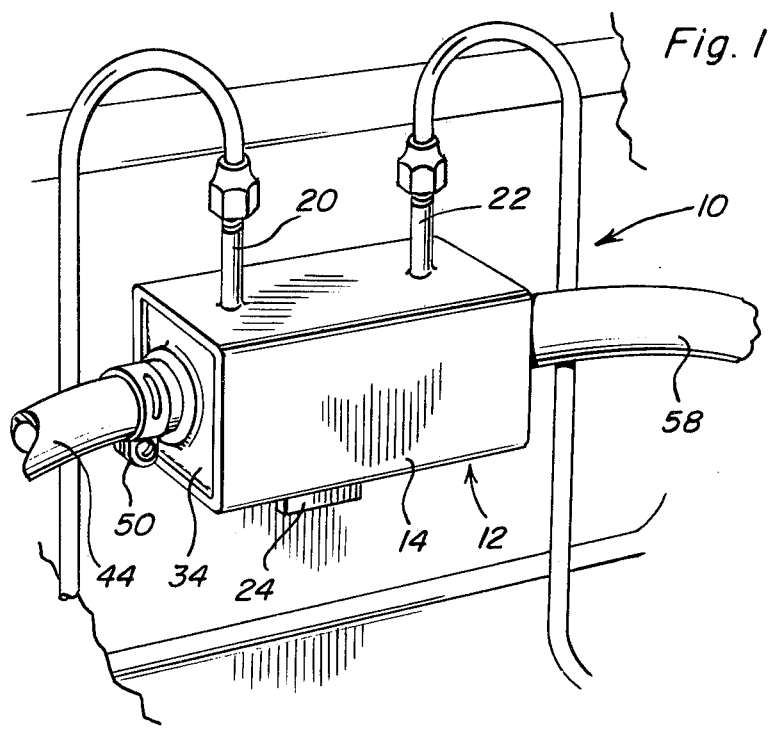
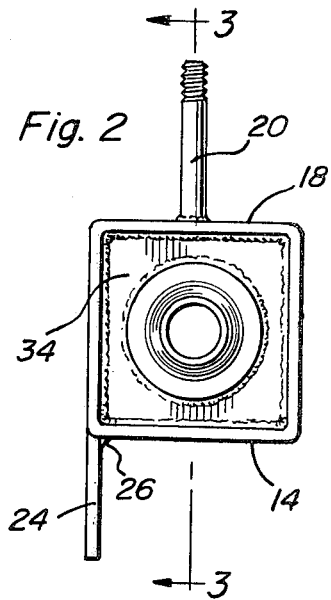
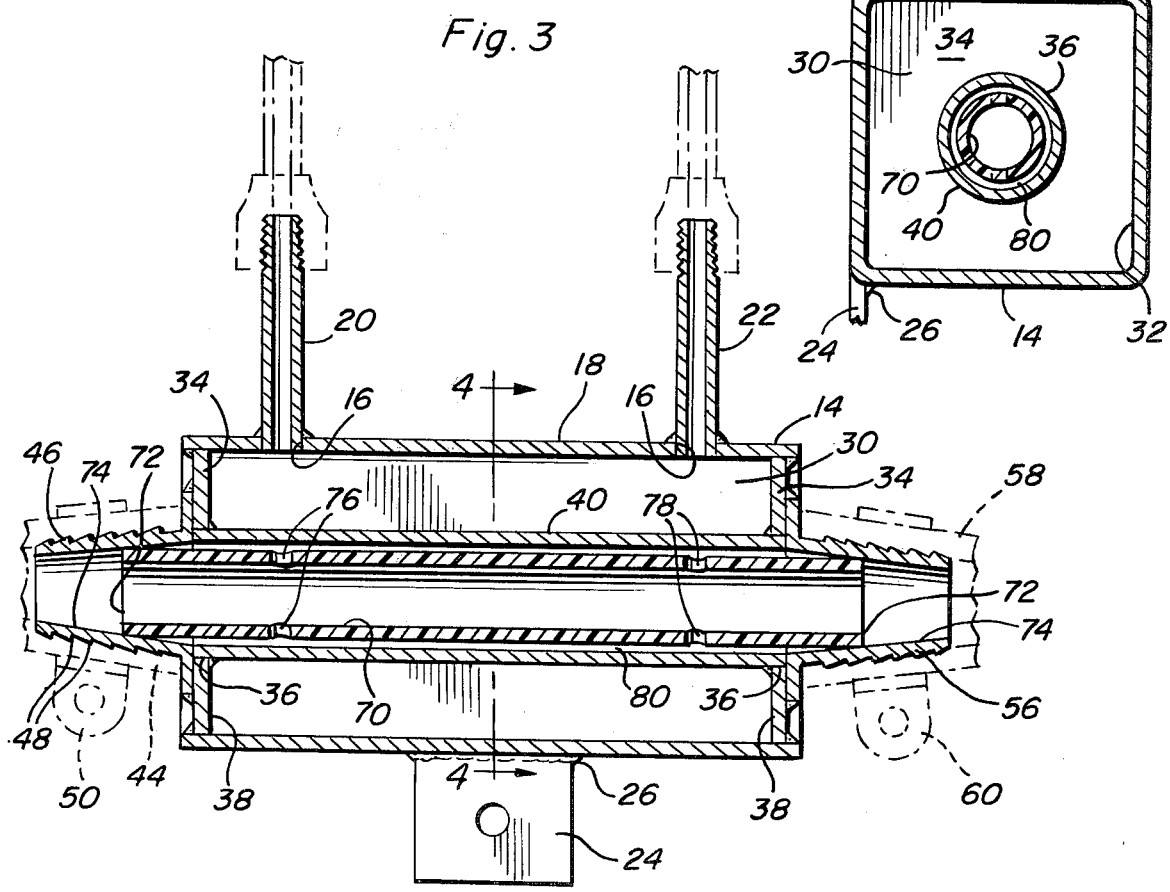
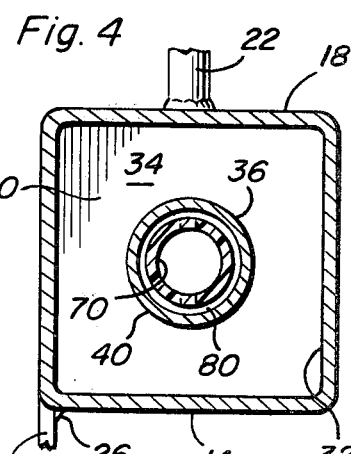

FUEL PRE-HEATER

BACKGROUND OF THE INVENTION

The present invention relates to fuel pre-heater apparatus for exchanging engine heat withdrawn from an internal combustion engine system into heat for preheating fuel for subsequent use in the internal combustion engine and regulating water flow control along the heat transfer surface of the pre-heater apparatus. The apparatus is capable of use in combination with any liquid cooled internal combustion engine such as gasoline, gasohol and diesel engines, and the like, for automobiles and trucks so that the fuel being processed for use by an internal combustion engine such as it being processed by a carburetor or the like, passes through a space for receiving heat that is withdrawn from the internal combustion engine cooling system. The invention also includes regulating the amount of heat transfer by appropriate use of a plastic pipe having apertures for selectively passing a heated turbulent media into engagement with a heat transfer surface and can be replaced for achieving various quantities of heat transfer for the advantage of fuel saving and efficiency in mileage per gallon of fuel.

FIELD OF THE INVENTION

With the demand for an improved and controlled environment many arrangements are found to suggest economy in fuel consumption as well as useful application of heat energy withdrawn from an internal combustion system resulting from the process of internal fuel combustion. Usually, heat is carefully and selectively withdrawn from the internal combustion engine system and applied to a water heater elsewhere located in the vehicle. The present invention provides for applying and transferring some of the heat of this system into a fuel pre-heater by heat exchange regulated and controlled methods and apparatus such that the heat is applied directly to the fuel as it is inserted, injected or fed into the combustion chamber or areas of an internal combustion engine.

A device for controlling and regulating amounts of heat transfer from the heat system to the system containing the fuel for application to the internal combustion engine is within the contemplation of the present invention and in which new structures, functions and results are obtained by use of the invention. Improved fuel utilization, longer use of spark plugs where they are used in the given internal combustion engine and reduced carbon buildup on the cylinder walls, heads and other components are found to be by-products and advantages of the invention. The fuel system is found to be cleaner and the carburetor, where one is part of the system, works smoothly, fuel consumption is reduced and, in overall fashion, the engine works with some greater efficiency. The concept may be applicable to gasoline engines, gasohol engines, as well as diesel engines.

DESCRIPTION OF THE PRIOR ART

Various arrangements of prior art systems and devices have generally been known such as are found exemplary in several U.S. patents as follows: U.S. Pat. Nos. Re. 26,186; 1,234,116; 3,472,214; 4,091,782; 4,218,997.

The patent to Shearer discloses an inline fuel heater which includes a use of a jacketed compartment positioned about an engine water flow line with a supply of engine fuel being directed through the compartment so as to heat the same. Similarly, patents to Moon and Dunnam disclose further fuel heating apparatus which are of a jacketed-type construction and which utilizes an engine coolant for a purpose of heating fuel contained in the jackets. Patents to Barcus et al and McQuerry disclose fuel heaters that derive their heat from engine exhaust gases. None of these several patents, whether considered together or as a single disclosure, is believed to have any bearing on the patentability of any claim of this invention.

SUMMARY OF THE INVENTION

An object and advantage of the present invention is to provide a fuel pre-heating stage to gasoline engines and having equal application to gasohol and diesel-type fuel engines in which heater hoses are connected to the pre-heater apparatus of the present invention for preheating the fuel before it is inserted or injected into the internal combustion engine. The fuel may come from a fuel pump or other fuel source and the pre-heater apparatus is connected to hoses of a heat take-off system such as where heat is applied to water heaters or vehicle heaters of a truck, automobile, boat or other such vehicle.

A further object and advantage of the present invention is to provide a unique arrangement for regulating and controlling of a liquid heated medium in which the medium is applied to a heat exchange surface being under control and regulation within the purview of the present invention so that fuel saving and economy, improved mileage and fuel consumption, as well as less carbon buildup on cylinders, cylinder walls, spark plugs, heads and the like is achieved by the control means of the present invention.

An additional and further object of the present invention is to provide apparatus for exchanging engine heat into heat for pre-heating fuel for an internal combustion engine and for regulating water flow control along a heat transfer surface disposed within the preheating apparatus.

A further and additional object of the present invention is to provide a new and improved structural arrangement for regulating and control passage of a heated media which has withdrawn heat from an internal combustion engine so that it in turn may transfer the heat to fuel to be supplied to the engine.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a preferred embodiment and best mode of the fuel pre-heater apparatus of the present invention.

FIG. 2 is an end view taken from the left side and without showing a heater line hose or fuel inlet or outlet line.

FIG. 3 is a sectional view taken along lines 3—3 of FIG. 2.

FIG. 4 is a sectional view taken along lines 4—4 of FIG. 3.

DESCRIPTION OF THE PREFERRED EMBODIMENT

Referring now to the drawings, there is shown fuel pre-heater apparatus 10 having a box or compartment 12 consisting of metal or plastic structures including a generally square tubing 14 and having a set of drill holes 16 through a top surface 18 for receiving a fuel inlet line 20 and a fuel outlet line 22, respectively, which are coupled into a fuel supply line. The compartment may be secured in a conventional manner such as by a bracket member 24 welded onto the compartment 12 at welding joint 26 and the bracket member is then secured to or supported from an interior wall surface or other structure within an engine compartment or engine receiving space including an internal combustion engine for an automobile, truck or boat.

The compartment 12 contains a free space 30 bounded by interior walls 32 of the compartment throughout a length dimension thereof and bounded by end walls 34 having generally central openings 36 and interior surface walls 38 thus completing enclosing of the free space after a hollow metal tubular member 40 passes centrally and connectedly between the central openings 36. The defined free space 30 is in the form of a hollow volume. The free space receives and is filled by fuel from fuel inlet line 20 for essentially filling the free space and passing out through fuel outlet line 22 after it is preheated by heat exchange of heat energy received from the hollow metal tubular member 40 which received heated water flow from engine water cooling systems, automotive or vehicular water heater systems and the like of conventional construction and not shown in detail. From these systems heated water flow passes into the hollow metal tubular member 40 through a coupled water hose 44 secured onto a tapered male adaptor 46 having retaining ridges 48 of a conventional construction and design shown in FIG. 3. A hose clamp 50 retains the hose 44 onto the male adaptor 46 and the male adaptor is shown fixedly secured by welding or the like onto an adjacent surface of the end wall 34. Heated water flow thus passing into the hollow metal tubular member 40 transfers some of its heat energy from the interior of the tubular member through its walls radially to the fuel in the free space 30 so the fuel is thusly heated prior to it passing in the fuel outlet line 22 to combustion spaces of an internal combustion engine (not shown). This heated water passes through another tapered male adaptor 56 fixedly secured by welding or the like onto an adjacent surface of the end wall 34 and thence to a coupled water hose 58 similarly retained onto the male adaptor 56 by a hose clamp 60 shown in phantom in FIG. 3. The heated water passes through the water hose which is coupled in circuit with the water cooling section of an internal combustion engine or the water conduit section of a passenger hot water heater unit of an automobile, truck or other vehicle.

In order to maximize control and regulation of the heat exchange operation of the hollow metal tubular member and its attending or associated structures and for so controlling and regulating the pre-heating of the fuel and the amount of heat withdrawn from and transferred from the heated medium or water flow passing through the member in contact with its heat transfer surface thereof, a length of a hollow pipe 70 of insulation plastic and which is of generally rigid and resilient materials, is placed within the hollow metal member 40 prior to assembling of a last tapered male adaptor 46, 56 onto the compartment 12. The diameter and configuration of the hollow plastic pipe 70 is sufficiently sized that it cannot be withdrawn from an exterior opening of the male adaptors 46, 56 and the ends or lips 72 of the plastic pipe engage an inner conic surface 74 of the male adaptors. Selective heated media flow engagement with the tubular member 40 is accomplished by the heated media allowed to pass only through openings or apertures 76 for engagement with the tubular member 40 and thence return to the heated media flow path through apertures 78. For increased heated media flow, the apertures 76, 78 are made of large diameters such as for greater flow control or regulation and for use when the fuel is viscous such as a diesel fuel. For achieving a smaller degree of heat exchange from a heated media flow passing in and through fuel pre-heater apparatus 10, a thicker plastic pipe 70 and smaller sized apertures 78 are provided on the plastic pipe. The plastic pipe is a member that is capable quite easily of being replaced, substituted and exchanged for others in the apparatus, in order to achieve the maximum novel arrangement of control and regulation of the fuel pre-heater system. One of the preferred arrangements for achieving significant heat transfer capabilities is to provide that these apertures are generally radially disposed along the length of the plastic pipe for the circulation of heated media into a space 80 formed between an inner surface of the hollow metal member 40 and the outer surface of the hollow plastic pipe 70.

While an assembly of the hollow member 40 may be constructed of several pieces or components and layers of material including a plastic inner pipe 70, it is noted that the preferred arrangement mandates that the hollow member is joined at its end to the ends or end walls 34 and that the length of the plastic pipe may generally exceed this length in order to preclude accessible heated media flow over the lips 72 at each end. It is found that generally recognizable and preferred heat flow is provided by the spatially arranged apertures 76, 78 rather than over lips 72 at either of the ends, in order to avoid lamina media flow, since lamina flow appears to provide less heat transfer for accomplishing the heat transfer and pre-heating of fuel. The plastic pipe 70 may be constructed of insulation and generally rigid structural plastic materials such as polyvinyl chloride.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Fuel pre-heater apparatus for exchanging engine heat into heat for preheating fuel for an internal combustion engine and for regulating water flow control along a heat transfer surface thereof comprising a compartment formed by an enveloping wall, a hollow metal member passing centrally through the compartment having an inlet coupling and an outlet coupling, the inlet coupling and the outlet coupling each having an inner and outer tapering surface contour adapted for receiving thereon an end of a flexible hose coupled to the cooling system of an internal combustion engine, a length of a hollow pipe of insulation plastic of a diameter to be disposed within the hollow metal member and having ends thereof frictionally engaging respective inner tapering surface contours of the inlet coupling and the outlet coupling, the compartment at separate peripheral locations thereof having a fuel inlet line for receiving fuel into the compartment and a fuel outlet line for discharging preheated fuel from within the compartment to combustion chambers of an internal combustion engine wherein the hollow plastic pipe acts to control the heat of water flowing along the inner surface of the hollow metal member and helps to keep the fuel system cleaner and the carburetor operating smoothly.

2. The invention of claim 1 wherein the hollow plastic pipe contains a plurality of radially disposed apertures for circulation of water into space formed between an inner surface of the hollow metal member and the outer surface of the hollow plastic pipe.

3. The invention of claim 1 wherein the hollow metal member is constructed of at least one piece joined at an intermediate circumferential surface after insertion of the hollow plastic pipe.

4. The invention of claim 1 wherein the compartment is generally rectangularly configured.

5. The invention of claim 1 wherein the plastic pipe is polyvinyl chloride material.

6. The invention of claim 1 wherein the compartment is a generally rectangularly configured box having adequate volume therein for heat exchange energy from the hollow metal member to heat the fuel present within a volume of the compartment prior to the fuel passing therefrom to a combustion chamber of an internal combustion engine.

7. The invention of claim 1 wherein the compartment includes bracket means for securing and supporting the compartment from a surface proximate the internal combustion engine.

8. The invention of claim 1 wherein the hollow plastic pipe has a plurality of apertures in which the number and sizes thereof determine the amount of water flow through the plastic pipe for contacting the inner surface of the hollow metal member, the heating of which transfers its heat to fuel within and passing through the compartment, a fewer number of apertures for some gasoline engines and a greater number of apertures for some diesel engines and a proportionate intermediate number of apertures from model to model of each type of engine.

9. The invention of claim 1 wherein the length of the hollow plastic pipe and the thickness thereof together with a number of apertures therein for passing heated water into contact with the inner surface of the hollow metal member controls the temperature of the hollow metal member and its transference of heat to fuel within the compartment.

* * * * *